United States Patent
Mueller et al.

(10) Patent No.: US 6,978,640 B2
(45) Date of Patent: Dec. 27, 2005

(54) DEVICE AND METHOD FOR THE SIMULTANEOUS PRODUCTION OF GLASS PRODUCTS WITH VARYING MASSES

(75) Inventors: Franz Mueller, Kronach (DE); Alfred Krischke, Tettau (DE); Wilfried Jungkunz, Teuschnitz (DE)

(73) Assignee: Heinz-Glas GmbH, Kleintettau (DE)

( * ) Notice: Subject to any disclaimer, the term of this patent is extended or adjusted under 35 U.S.C. 154(b) by 532 days.

(21) Appl. No.: 10/333,944
(22) PCT Filed: May 21, 2002
(86) PCT No.: PCT/DE02/01826
§ 371 (c)(1),
(2), (4) Date: Jan. 23, 2003
(87) PCT Pub. No.: WO02/100786
PCT Pub. Date: Dec. 19, 2002

(65) Prior Publication Data
US 2003/0172675 A1    Sep. 18, 2003

(30) Foreign Application Priority Data
Jun. 12, 2001 (EP) ................................ 01114243

(51) Int. Cl.$^7$ ............................................. C03B 11/16
(52) U.S. Cl. .................. 65/29.11; 65/29.12; 65/122; 65/126; 65/133; 65/159; 65/164; 65/224; 65/225
(58) Field of Search .............................. 65/29.1, 29.11, 65/29.12, 122, 126, 133, 158, 159, 160, 163, 65/164, 165, 224, 225; 209/522; 425/136, 425/139, 145, 146

(56) References Cited
U.S. PATENT DOCUMENTS
3,767,374 A * 10/1973 Iacovazzi et al. ............. 65/165
(Continued)

FOREIGN PATENT DOCUMENTS
EP    0 668 248    8/1995
JP    2-263721   * 10/1990

OTHER PUBLICATIONS
Patent Abstracts of Japan, vol. 15, No. 27 (Jan. 1991).
(Continued)

Primary Examiner—Sean Vincent
(74) Attorney, Agent, or Firm—Smith-Hill and Bedell

(57) ABSTRACT

The invention relates to a manufacturing apparatus for simultaneously making different hollow glass products having different gob sizes comprising at least one feed apparatus (12), that has at least one glass reservoir (14), at least one plunger (18a, b), and at least one appurtenant cutting device (24a, b) in the discharge from the reservoir, at least one conveying means (28) to successively transport at least one of the gobs discharged from the feed apparatus (12) into a plurality of shape-imparting units (32a–c) disposed next to each other for variously sized gobs, at least one controller (22) to control the plunger (18a, b) and the cutting device (24a, b) of the feed apparatus (12), the conveying means (28), and the shape-imparting units (32a–c), and said controller (22) controls the activity of the shape-imparting units (32a–c), the feed apparatus (12), and the conveying means (28) in coordination with the gob-size-specific processing time of the products in the shape-imparting units (32a–c) or their cycle time, and the controller (22) is embodied in such a way that, when it determines that the feed times of at least two shape-imparting units (32a–c) will coincide, or if the interval between the times that two of the shape-imparting units (32 a–c) are fed will be less than the time necessary for a feed operation, the feeding of one of the shape-imparting units (32a–c) that is to be fed will be delayed and shifted to a subordinate available time window that is long enough to allow the feeding of the not-yet-fed shape-imparting unit(s) to be performed.

The invention also relates to a manufacturing process for hollow glass products that uses the said apparatus. Glass products having different masses can be made simultaneously in a single manufacturing apparatus.

11 Claims, 1 Drawing Sheet

U.S. PATENT DOCUMENTS

| | | | | |
|---|---|---|---|---|
| 4,266,961 | A | * | 5/1981 | Wood .......................... 65/158 |
| 4,364,764 | A | * | 12/1982 | Farkas et al. ................ 65/29.1 |
| 4,431,436 | A | * | 2/1984 | Lulejian ...................... 65/159 |
| 4,453,963 | A | * | 6/1984 | Larson et al. .............. 65/29.11 |
| 4,459,146 | A | * | 7/1984 | Farkas et al. .............. 65/29.11 |
| 4,478,629 | A | * | 10/1984 | Wood et al. .................. 65/163 |
| 4,615,723 | A | * | 10/1986 | Rodriguez-Fernandez et al. .......................... 65/163 |
| 4,793,846 | A | * | 12/1988 | Peterson ...................... 65/164 |
| 5,580,366 | A | * | 12/1996 | Farkas et al. ................ 65/158 |
| 2002/0194875 | A1 | * | 12/2002 | Simon ......................... 65/158 |

OTHER PUBLICATIONS

Patent Abstracts of Japan, vol. 13, No. 562 (Dec. 1989).
Patent Abstracts of Japan, vol. 18, No. 482 (Sep. 1994).

* cited by examiner

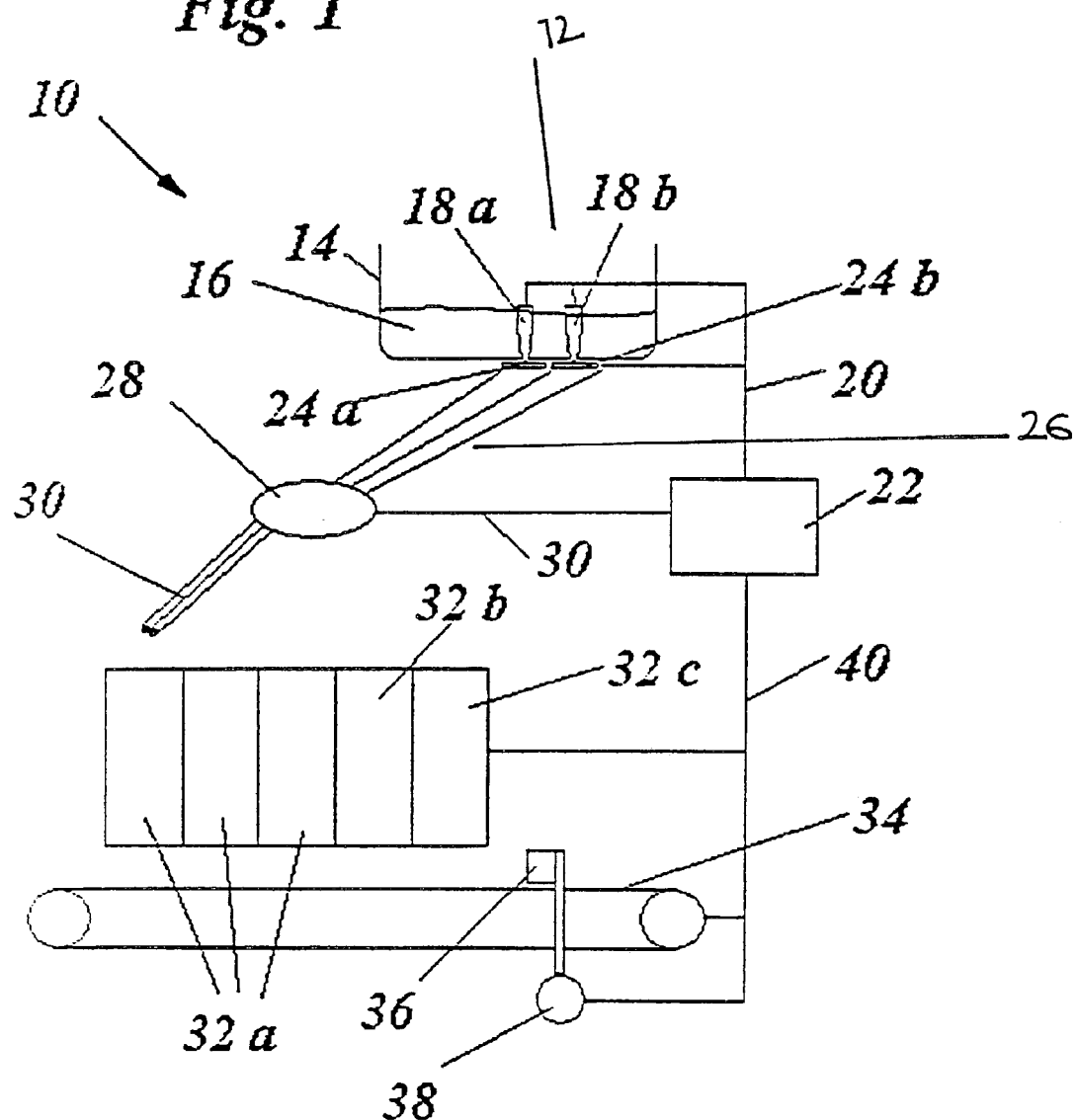

DEVICE AND METHOD FOR THE SIMULTANEOUS PRODUCTION OF GLASS PRODUCTS WITH VARYING MASSES

The invention relates to a manufacturing process and a manufacturing apparatus for simultaneously making different glass products—in particular, hollow glass products—having different masses, in other words different gob sizes.

In the prior art, manufacturing machines for glass products, in particular for making hollow glass products such as bottles and flasks, have a series of shape-imparting units that are provided for a hollow glass product or for different hollow glass products. The shape-imparting units accept the masses of glass—referred to in short as gobs—which are at a processing temperature of about 1100–1250° C., from a feed apparatus, which comprises at least one glass reservoir, one or more plungers, which expose an opening in the glass reservoir to discharge a gob, and a cutting device appurtenant to each plunger that is used to cut off the gob in a defined manner in order to achieve a specific gob size. The gob that is discharged from the feed apparatus is now transported via a slide trough of a conveying means successively to a plurality of shape-imparting units, which are operated in sequence. The shape-imparting units may be configured to manufacture different hollow glass products. However, the gob sizes of the different hollow glass products must be identical so that the same cycle time—in other words, the period of the feed time—results for each shape-imparting unit.

The object of the invention is to improve upon the defined process and upon an apparatus to make different glass products in such a way that glass products having different masses—in other words that require a different gob size—can be made at the same time. This object is accomplished by an apparatus as recited in claim 1 and a process as recited in claim 4. Preferred embodiments of the invention are recited in the corresponding dependent claims.

In the invention, the plunger and the appurtenant cutting device are controlled individually with respect to actuation times and actuation distance, so that gobs of different sizes can be produced. Instead of one plunger, a plurality of plungers—in other words, charging means—can be provided in the feed apparatus. In this case, it is possible to discharge double and triple gobs for correspondingly designed shape-imparting units. This means that in one feed operation two or three products having an identical gob size can be made simultaneously in a single shape-imparting unit. The charging means of the feed apparatus, in particular the plungers and the appurtenant cutting means can be controlled by a controller in coordination or synchronization with the conveying means relative to the shape-imparting units and the operation of said shape-imparting units. The discharged gobs are caught by the conveying means and are transported in succession to the individual shape-imparting units. Since different gobs can now be processed in different shape-imparting units, the cycle time—in other words the processing period and thus the feed cycles of the individual shape-imparting units—are no longer identical, which means that the conveying means must be controlled by the controller in such a way that each shape-imparting unit is supplied with material at a feed time that corresponds to its individual feed cycle, rather than maintaining a specific feed process. The controller contains a processor that calculates in advance the cycle time for the shape-imparting units based on the gob size. If a shape-imparting unit is operated with a specific gob size, the controller calculates the optimum starting time for the processing cycle in advance, so that the smallest possible number of overlaps with the feed times of the other shape-imparting units result. The first feed to the shape-imparting unit is then performed at the calculated starting time. In addition, if the controller determines that the feed of a plurality of shape-importing units occurs simultaneously or that the time difference for feeding two or more shape-imparting units is not sufficient to perform the feed operation, the feeding of one or more of the shape-imparting units that are to be fed simultaneously is shifted to the next available time window that permits the non-fed shape-imparting unit(s) to be fed. The product made in the shape-imparting unit that is fed with a delay is preferably separated from the other products or immediately culled out into a reject container. In this way, only those products that were made in a specified production cycle are processed further or are transferred to the packaging means. The delayed feeding to a shape-imparting unit results in minor temperature differences in the production mold compared with the thermal conditions that prevail in the normal feed cycle, and this can lead to modified dimensions or properties of the products whose manufacture is delayed. For this reason, by separating those products that were made in a shape-imparting unit that was supplied with a time delay, the overall rejection of hollow glass products transported to the packaging means or to a downstream processing means can be significantly reduced.

The advantage of the invention is that different products having different manufacturing or shape-imparting times can be made in the shape-imparting units in a single machine, something which was not possible in the prior art. This is made possible by the individually controlled creation of differently sized gobs as well as by the systematic controlling of the conveying means leading to the shape-imparting units that must be fed next, controlled by at least one controller, which solves the problem of simultaneous feeds in the manner of the invention—in other words, by delaying one or more of the shape-imparting units that are to be supplied simultaneously. As regards the question of which of the shape-imparting units are to be supplied with a delay, preferably the next time window in which feed is possible is selected. Then, for the shape-imparting units that are to be supplied simultaneously, beginning with the selected, next-possible available time window and taking the individual cycle time of the shape-imparting units into account, the controller determines in which of the shape-imparting units the lowest frequency of overlap (overlaps per time unit) with a feeding of other shape-imparting units occurs. Finally, the shape-imparting unit that has the lowest overlap frequency is delayed to the next time window. This prevents delaying the feed to a shape-imparting unit that previously has experienced few overlaps with the feeds to other shape-imparting units and now, after the delay to the new time window and taking its individual cycle time into account, has relatively frequent overlaps. As a result, the delaying of that shape-imparting unit or those shape-imparting units that exhibits/exhibit the fewest possible overlaps with new starting time for the time window taking its/their cycle time into account results in a process that is economically very advantageous.

The apparatus of the invention may be an apparatus to simultaneously process two or three gobs in the shape-imparting units, in which case a corresponding number of charging means must be present in the feed apparatus. Said charging means may either be controlled individually or in a synchronized manner, provided that their design ensures that upon synchronized operation the size of the gob is identical with all discharge means.

The individual components may be controlled in a decentralized or centralized manner. The maximum number of shape-imparting units is based on the capacity of the feed apparatus and of the conveying means, and therefore can comprise up to 20 or more units, for example. Instead of hollow glass products, other products such as pressed glass products can be processed.

The invention shall now be described by way of example based on the schematic diagram. This diagram shows a manufacturing apparatus that is used to simultaneously process two gobs for each shape-imparting unit.

The manufacturing machine 10 comprises a feed apparatus 12, consisting of a glass reservoir 14, in which a glass melt 16 that has been heated to about 1100 to 1250° C. is located. Two plungers 18a, 18b are disposed in the glass reservoir 14. Their operating mechanism (not shown) is connected by means of a control cable 20 to a centralized controller 22. The plungers 18a, 18b close openings in the bottom of the reservoir 16 in the closed position shown in the drawing. The discharge of a gob from the reservoir is accomplished by lifting the plungers 18a, 18b a defined distance for a defined time. The opening distance and the opening time of the plungers are controlled via control cable 20 by means of the controller 22. In this way, a defined quantity of glass, which will subsequently be referred to as the "gob," flows outside through the opening in the bottom of the reservoir. After the plungers return to their closed position, the gob is cut off by cutting means 24a, 24b located below the openings, and it falls into conveyor chutes 26 of a conveying means 28 that is connected to the central controller 22 by means of a control cable 30. The conveying means 28 has a movable feed chute 31 which permits the two gobs to be simultaneously transported to the individual shape-imparting units 32a–c. The first three shape-imparting units 32a are designed for the processing of a first gob size, while the last two shape-imparting units 32b, 32c are designed to process hollow glass products that require different gob sizes relative to each other and relative to the shape-imparting units 32a.

A conveyor belt 34 is located below the shape-imparting units 32, and a separating device 36 is disposed along the course of said conveyor belt 34. The separating device 36 is operated by a motor 38. The motor 38 that drives the separating device 36, the conveyor belt 34, as well as the shape-imparting units 32 are connected to the central controller 32 by means of a control line 40.

The operation of the manufacturing apparatus shown in FIG. 1 may be described as follows.

The hollow glass products that are to be made in the shape-imparting units 32a, 32b, and 32c require different cycle times due to the different gob sizes. The central controller 22 calculates the starting times for feeding the shape-imparting units 32a–c in such a way that, based on the starting times, the feeding of the shape-imparting units 32a–c and their cycle time result in the lowest possible number of feed overlaps.

After the starting times of the individual shape-imparting units 32a–c have been determined, two gobs of appropriate size are simultaneously produced in the feed apparatus and are transported via the conveying means 28 to the shape-imparting unit 32a–c that is to be fed next. Following the feed operation, two hollow glass products are blown from the two gobs in the different shape-imparting units, and are placed on the conveyor belt 34 by means of a transfer means (not shown).

If, due to the different cycle times that occur during the course of production, an overlap occurs in the feed time of two shape-imparting units, for example 32b, 32c, the controller calculates in advance—in other words, prior to the feed—which of the subsequent time windows is available for a delayed feed to one of the shape-imparting units that is to be fed at the same time, and for each of the shape-imparting units that are be fed simultaneously it calculates the frequency with which the feed times overlap using the delayed time window as the starting point. It then feeds with a delay to that shape-imparting unit that will have the lowest frequency of overlap of feed times with the other shape-imparting units using the new delayed time window. It is also possible for the controller to perform this comparison with different time windows—later time windows, for example—if a satisfactory result is not achieved with the next available time window.

The products that are made by the shape-imparting units at a delayed time can be removed from the belt by the motor-driven separating means 36 and culled out, optionally into a reject container, since the shape-imparting unit that is fed with a time delay may, as a result of the delayed feed, have lost some of its thermal equilibrium and, therefore, the product probably will not meet the specified production tolerances.

If the time to feed two shape-imparting units that are to be fed in sequence is not sufficient due to an inadequate time interval, the gob that is designated for the delayed shape-imparting unit can be transferred to the reject container before being fed into the shape-imparting unit.

What is claimed is:

1. A manufacturing apparatus for simultaneously making different glass products having different masses, comprising at least one feed apparatus, that has at least one glass reservoir, at least one plunger, and at least one appurtenant cutting device in the discharge from the reservoir, at least one conveying means to successively transport at least one of the gobs discharged from the feed apparatus into a plurality of shape-imparting units disposed next to each other for variously sized gobs, at least one controller to control the plunger and the cutting device of the feed apparatus, the conveying means, and the shape-imparting units, and said controller controls the activity of the shape-imparting units, the feed apparatus, and the conveying means in coordination with the gob-size-specific processing time of the products in the shape-imparting units or their cycle time and the controller is embodied in such a way that, when it determines that the feed times of at least two shape-imparting units will coincide or when it determines a that there will be a delay in the time the shape-imparting units are fed that will be less than the time necessary for a feed operation, the feeding of one of the shape-imparting units that is to be fed will be delayed and shifted to a subordinate available time window that is long enough to allow the feeding of the not-yet-fed shape-imparting unit(s) to be performed.

2. The manufacturing apparatus of claim 1, wherein a separating device is provided to separate selected products from the products created in the shape-imparting units, and said separating device is connected to the controller and can be operated by said controller to separate out the products that are produced in those shape-imparting units that are fed at delayed times.

3. The manufacturing process for the simultaneous manufacture of different glass products having different gob sizes in a manufacturing apparatus comprising at least one feed apparatus, that has at least one glass reservoir, at least one plunger, and at least one appurtenant cutting device in the discharge from the reservoir, at least one conveying means to successively transport at least one of the gobs discharged from the feed apparatus into a plurality of shape-imparting units disposed next to each other for variously sized gobs, at least one controller to control the plunger and the cutting device of the feed apparatus, the conveying means, and the shape-imparting units, and said controller controls the activity of the shape-imparting units, the feed apparatus, and the conveying means in coordination with the gob-size-specific processing time of the products in the shape-imparting units or their cycle time and if the feed times of at least two shape-imparting units coincide, or if the interval between the times that two of the shape-imparting units are fed will be less than the time necessary for a feed operation, the feeding of one of the shape-imparting units that is to be fed will be delayed and shifted to a subordinate available time window that is long enough to allow the feeding of the not-yet-fed shape-imparting unit(s) to be performed.

4. The manufacturing process of claim 3, wherein the product from a shape-imparting unit that was supplied at a delayed time is separated out and/or discarded.

5. The manufacturing apparatus of claim 1, wherein the feed apparatus has at least two plungers that can be controlled independently of one another, and the conveying means is configured to simultaneously transfer at least two gobs into at least one shape-imparting unit.

6. The manufacturing apparatus of claim 1, wherein the controller selects the first feed time for the beginning of operation of a shape-imparting unit depending on the feed times of the other shape-imparting units, and said feed time is selected in such a way that the fewest possible overlaps with the feed times of the other shape-imparting units occur.

7. The manufacturing process of claim 3, wherein the first feed time for the beginning of operation of a shape-imparting unit is selected depending on the feed times of the other shape-imparting units, in such a way that the frequency of overlaps with the feed times of the other shape-imparting units is low or minimized.

8. The manufacturing process of claim 3, wherein the feed time of that shape-imparting unit that has the lowest overlap frequency with the feed times of the other shape-imparting units, based on the subordinate time window, is selected as the starting time for the individual feed cycle.

9. The manufacturing process of claim 8 wherein the next available time interval that directly follows the specified feed time is selected and used as the subordinate time window, and a further time window is used following said selected time window if no solution leading to a satisfactorily low overlap frequency is found for the first time window.

10. The manufacturing process of claim 7, wherein the feed times of all shape-imparting units are analyzed within a given time period, for example between 5 min. and 2 hr., for the evaluation of the overlap frequency.

11. The manufacturing process of claim 3, wherein a plurality of gobs are made simultaneously and are transferred to a shape-imparting unit.

* * * * *